(12) United States Patent
Klein et al.

(10) Patent No.: US 10,489,795 B2
(45) Date of Patent: Nov. 26, 2019

(54) DETERMINING RELATIVE EFFECTIVENESS OF MEDIA CONTENT ITEMS

(75) Inventors: Mark D. Klein, Los Altos, CA (US); Jason Browne, San Mateo, CA (US); Craig Dougal Paterson, Oakland, CA (US)

(73) Assignee: The Nielsen Company (US), LLC, New York, NY (US)

( * ) Notice: Subject to any disclaimer, the term of this patent is extended or adjusted under 35 U.S.C. 154(b) by 656 days.

(21) Appl. No.: 12/618,950

(22) Filed: Nov. 16, 2009

(65) Prior Publication Data

US 2010/0114668 A1 May 6, 2010

Related U.S. Application Data

(63) Continuation-in-part of application No. 12/105,440, filed on Apr. 18, 2008, now abandoned.
(Continued)

(51) Int. Cl.
*G06Q 30/02* (2012.01)

(52) U.S. Cl.
CPC ......... *G06Q 30/02* (2013.01); *G06Q 30/0243* (2013.01); *G06Q 30/0246* (2013.01)

(58) Field of Classification Search
CPC . G06Q 30/02; G06Q 30/0246; G06Q 30/0243
(Continued)

(56) References Cited

U.S. PATENT DOCUMENTS

| | | |
|---|---|---|
| 4,025,851 A | 5/1977 | Haselwood et al. |
| 4,697,209 A | 9/1987 | Kiewit et al. |

(Continued)

FOREIGN PATENT DOCUMENTS

| | | |
|---|---|---|
| AT | 355662 | 3/2006 |
| AU | 5731398 | 8/1998 |

(Continued)

OTHER PUBLICATIONS

Messages in the Medium: An Experimental Investigation of Web Advertising Effectiveness and Attitudes toward Web Content Jeffrey Parsons, Katherine Gallagher, and K. Dale Foster Faculty of Business Administration Memorial University of Newfoundland St. John's, NF, A1B 3X5, Canada 2000 IEEE.*

(Continued)

*Primary Examiner* — Victoria E Frunzi
(74) *Attorney, Agent, or Firm* — Hanley, Flight & Zimmerman, LLC

(57) ABSTRACT

The effectiveness of advertisements with respect to a group of panelists is measured. Based on the results of such analysis, advertisements and/or variants thereof are selected for presentation to consumers. Effectiveness of advertisements may be measured by detecting exposure to advertisements, and then monitoring panelist behavior following exposure to an advertisement. A group of panelists may be a representative sample of a larger population, so that observations of panelist behavior can be used as a basis for making decisions regarding presentation of advertisements to a larger audience having characteristics similar to those of the panelists. Once the relative effectiveness for various audiences has been determined, advertisements can be selected for presentation to individual consumers or to groups of consumers, so as to maximize effectiveness. Such analysis and selection may be performed substantially in real-time.

31 Claims, 3 Drawing Sheets

Related U.S. Application Data

(60) Provisional application No. 61/157,843, filed on Mar. 5, 2009, provisional application No. 60/913,479, filed on Apr. 23, 2007.

(58) Field of Classification Search
USPC .................................. 705/14, 14.43, 14.45
See application file for complete search history.

(56) References Cited

U.S. PATENT DOCUMENTS

| | | | |
|---|---|---|---|
| 4,718,106 A | 1/1988 | Weinblatt | |
| 4,750,213 A | 6/1988 | Novak | |
| 4,973,952 A | 11/1990 | Malec et al. | |
| 5,287,266 A | 2/1994 | Malec et al. | |
| 5,374,951 A * | 12/1994 | Welsh | 725/20 |
| 5,457,807 A | 10/1995 | Weinblatt | |
| 5,481,294 A * | 1/1996 | Thomas et al. | 725/20 |
| 5,532,732 A | 7/1996 | Yuen et al. | |
| 5,574,962 A | 11/1996 | Fardeau et al. | |
| 5,581,800 A | 12/1996 | Fardeau et al. | |
| 5,594,934 A * | 1/1997 | Lu et al. | 725/18 |
| 5,612,729 A * | 3/1997 | Ellis et al. | 725/22 |
| 5,630,203 A | 5/1997 | Weinblatt | |
| 5,659,350 A | 8/1997 | Hendricks et al. | |
| 5,668,917 A | 9/1997 | Lewine | |
| 5,675,510 A | 10/1997 | Coffey et al. | |
| 5,764,763 A | 6/1998 | Jensen et al. | |
| 5,768,680 A | 6/1998 | Thomas | |
| 5,794,210 A | 8/1998 | Goldhaber et al. | |
| 5,812,732 A | 9/1998 | Dettmer et al. | |
| 5,821,513 A | 10/1998 | O'Hagan et al. | |
| 5,872,588 A | 2/1999 | Aras et al. | |
| 5,948,061 A | 7/1999 | Merriman et al. | |
| 5,966,696 A | 10/1999 | Giraud | |
| 5,987,210 A | 11/1999 | Iggulden et al. | |
| 5,991,735 A | 11/1999 | Gerace | |
| 6,006,197 A | 12/1999 | D'Eon et al. | |
| 6,091,956 A | 7/2000 | Hollenberg | |
| 6,100,941 A | 8/2000 | Dimitrova et al. | |
| 6,108,637 A | 8/2000 | Blumenau | |
| 6,115,680 A | 9/2000 | Coffee et al. | |
| 6,177,931 B1 | 1/2001 | Alexander et al. | |
| 6,285,818 B1 | 9/2001 | Suito et al. | |
| 6,370,629 B1 | 4/2002 | Hastings et al. | |
| 6,386,450 B1 | 5/2002 | Ogasawara | |
| 6,438,579 B1 * | 8/2002 | Hosken | 709/203 |
| 6,457,010 B1 | 9/2002 | Eldering et al. | |
| 6,470,386 B1 | 10/2002 | Combar et al. | |
| 6,477,508 B1 | 11/2002 | Lazar et al. | |
| 6,574,594 B2 | 6/2003 | Pitman et al. | |
| 6,581,025 B2 | 6/2003 | Lehman | |
| 6,584,375 B2 | 6/2003 | Bancroft et al. | |
| 6,587,835 B1 | 7/2003 | Treyz et al. | |
| 6,606,605 B1 | 8/2003 | Kolls | |
| 6,633,651 B1 | 10/2003 | Hirzalla et al. | |
| 6,647,269 B2 | 11/2003 | Hendrey et al. | |
| 6,698,020 B1 | 2/2004 | Zigmond et al. | |
| 6,708,335 B1 | 3/2004 | Ozer et al. | |
| 6,718,551 B1 | 4/2004 | Swix et al. | |
| 6,745,011 B1 | 6/2004 | Hendrickson et al. | |
| 6,754,470 B2 | 6/2004 | Hendrickson | |
| 6,766,523 B2 | 7/2004 | Herley | |
| 6,837,436 B2 | 1/2005 | Swartz et al. | |
| 6,912,507 B1 | 6/2005 | Phillips et al. | |
| 6,912,545 B1 | 6/2005 | Lundy et al. | |
| 6,934,508 B2 | 8/2005 | Ceresoli et al. | |
| 6,944,447 B2 | 9/2005 | Portman et al. | |
| 6,958,710 B2 | 10/2005 | Zhang et al. | |
| 6,968,178 B2 | 11/2005 | Pradhan et al. | |
| 6,970,131 B2 | 11/2005 | Percy et al. | |
| 6,983,139 B2 | 1/2006 | Dowling et al. | |
| 6,990,453 B2 | 1/2006 | Wang | |
| 6,993,245 B1 | 1/2006 | Harville | |
| 6,999,715 B2 | 2/2006 | Hayter et al. | |
| 7,031,921 B2 | 4/2006 | Pitman et al. | |
| 7,038,619 B2 * | 5/2006 | Percy et al. | 342/357.52 |
| 7,051,038 B1 | 5/2006 | Yeh et al. | |
| 7,069,238 B2 | 6/2006 | I'Anson et al. | |
| 7,075,000 B2 * | 7/2006 | Gang et al. | 84/600 |
| 7,089,575 B2 | 8/2006 | Agnihotri et al. | |
| 7,127,261 B2 | 10/2006 | Van Erlach | |
| 7,149,549 B1 | 12/2006 | Ortiz et al. | |
| 7,155,210 B2 | 12/2006 | Benson | |
| 7,164,798 B2 | 1/2007 | Hua et al. | |
| 7,194,752 B1 | 3/2007 | Kenyon et al. | |
| 7,206,647 B2 | 4/2007 | Kumar | |
| 7,206,753 B2 | 4/2007 | Bancroft et al. | |
| 7,222,105 B1 * | 5/2007 | Romansky | 705/57 |
| 7,227,498 B2 | 6/2007 | Soliman | |
| 7,346,512 B2 | 3/2008 | Wang | |
| 7,359,889 B2 | 4/2008 | Wang | |
| 7,366,461 B1 | 4/2008 | Brown | |
| 7,444,658 B1 | 10/2008 | Matz et al. | |
| 7,487,112 B2 | 2/2009 | Barnes, Jr. | |
| 8,023,663 B2 * | 9/2011 | Goldberg | 381/74 |
| 8,302,120 B2 | 10/2012 | Ramaswamy | |
| 2001/0037232 A1 | 11/2001 | Miller | |
| 2001/0039658 A1 | 11/2001 | Walton | |
| 2002/0002504 A1 | 1/2002 | Engel et al. | |
| 2002/0029267 A1 * | 3/2002 | Sankuratripati et al. | 709/224 |
| 2002/0032904 A1 | 3/2002 | Lerner | |
| 2002/0046104 A1 | 4/2002 | Kaddeche et al. | |
| 2002/0046118 A1 * | 4/2002 | Minte | 705/14 |
| 2002/0078056 A1 | 6/2002 | Hunt et al. | |
| 2002/0082837 A1 | 6/2002 | Pitman et al. | |
| 2002/0168938 A1 | 11/2002 | Chang | |
| 2003/0014747 A1 | 1/2003 | Spehr | |
| 2003/0079015 A1 | 4/2003 | Fein et al. | |
| 2003/0115098 A1 | 6/2003 | Kang | |
| 2003/0123850 A1 | 6/2003 | Jun et al. | |
| 2003/0126013 A1 | 7/2003 | Shand | |
| 2003/0126597 A1 | 7/2003 | Darby et al. | |
| 2003/0131100 A1 | 7/2003 | Godon et al. | |
| 2003/0131350 A1 | 7/2003 | Peiffer et al. | |
| 2003/0163370 A1 * | 8/2003 | Chen et al. | 705/14 |
| 2003/0170001 A1 * | 9/2003 | Breen | 386/46 |
| 2003/0226142 A1 | 12/2003 | Rand | |
| 2004/0073538 A1 | 4/2004 | Leishman et al. | |
| 2004/0073915 A1 | 4/2004 | Dureau | |
| 2004/0073916 A1 | 4/2004 | Petrovic et al. | |
| 2004/0117259 A1 | 6/2004 | Morrisroe et al. | |
| 2004/0122679 A1 * | 6/2004 | Neuhauser et al. | 704/500 |
| 2004/0181799 A1 | 9/2004 | Lu et al. | |
| 2004/0202348 A1 | 10/2004 | Kuzma | |
| 2004/0210922 A1 * | 10/2004 | Peiffer et al. | 725/9 |
| 2004/0226035 A1 | 11/2004 | Hauser | |
| 2005/0021397 A1 * | 1/2005 | Cui et al. | 705/14 |
| 2005/0028188 A1 * | 2/2005 | Latona | G06Q 30/02 725/13 |
| 2005/0035857 A1 | 2/2005 | Zhang et al. | |
| 2005/0065976 A1 | 3/2005 | Holm et al. | |
| 2005/0066352 A1 | 3/2005 | Herley | |
| 2005/0086682 A1 | 4/2005 | Burges et al. | |
| 2005/0203798 A1 | 9/2005 | Jensen et al. | |
| 2005/0232411 A1 * | 10/2005 | Srinivasan et al. | 379/413 |
| 2005/0234774 A1 | 10/2005 | Dupree | |
| 2005/0244561 A1 | 12/2005 | McDonald | |
| 2005/0264430 A1 | 12/2005 | Zhang et al. | |
| 2005/0267750 A1 | 12/2005 | Steuer et al. | |
| 2005/0289583 A1 | 12/2005 | Chiu | |
| 2006/0031288 A1 * | 2/2006 | Ter Horst et al. | 709/204 |
| 2006/0041480 A1 * | 2/2006 | Briggs | 705/14 |
| 2006/0059277 A1 * | 3/2006 | Zito et al. | 710/15 |
| 2006/0106674 A1 | 5/2006 | Muller | |
| 2006/0122877 A1 | 6/2006 | Yazdani et al. | |
| 2006/0259355 A1 * | 11/2006 | Farouki et al. | 705/14 |
| 2006/0259360 A1 * | 11/2006 | Flinn et al. | 705/14 |
| 2006/0287913 A1 | 12/2006 | Baluja | |
| 2006/0288374 A1 | 12/2006 | Ferris et al. | |
| 2006/0293948 A1 | 12/2006 | Weinblatt | |
| 2007/0006250 A1 * | 1/2007 | Croy et al. | 725/9 |
| 2007/0016918 A1 * | 1/2007 | Alcorn et al. | 725/22 |
| 2007/0061195 A1 * | 3/2007 | Liu et al. | 705/14 |
| 2007/0107008 A1 | 5/2007 | Dybus | |

(56) References Cited

U.S. PATENT DOCUMENTS

| | | |
|---|---|---|
| 2007/0124756 A1 | 5/2007 | Covell et al. |
| 2007/0124757 A1 | 5/2007 | Breen |
| 2007/0143777 A1 | 6/2007 | Wang |
| 2007/0157224 A1 | 7/2007 | Pouliot et al. |
| 2007/0244750 A1 | 10/2007 | Grannan et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0077502 A1 | 3/2008 | Boyd |
| 2008/0086356 A1 | 4/2008 | Glassman et al. |
| 2008/0134255 A1 | 6/2008 | Ferris et al. |
| 2008/0140479 A1 | 6/2008 | Mello et al. |
| 2008/0148309 A1* | 6/2008 | Wilcox et al. ............ 725/14 |
| 2008/0214253 A1 | 9/2008 | Gillo et al. |
| 2008/0215679 A1 | 9/2008 | Gillo et al. |
| 2008/0215971 A1 | 9/2008 | Gillo et al. |
| 2008/0215972 A1 | 9/2008 | Zalewski et al. |
| 2008/0215973 A1 | 9/2008 | Zalewski et al. |
| 2008/0215974 A1 | 9/2008 | Harrison et al. |
| 2008/0215975 A1 | 9/2008 | Harrison et al. |
| 2008/0215994 A1 | 9/2008 | Harrison et al. |
| 2008/0235582 A1 | 9/2008 | Zalewski et al. |
| 2008/0319850 A1 | 12/2008 | Shaul et al. |
| 2009/0030780 A1 | 1/2009 | York et al. |
| 2009/0210892 A1 | 8/2009 | Ramaswamy |
| 2009/0225994 A1* | 9/2009 | Topchy et al. ............ 381/56 |
| 2009/0292587 A1 | 11/2009 | Fitzgerald |
| 2009/0318224 A1 | 12/2009 | Ealey |
| 2012/0173701 A1 | 7/2012 | Tenbrock |
| 2013/0024275 A1 | 1/2013 | Ramaswamy |

FOREIGN PATENT DOCUMENTS

| | | |
|---|---|---|
| AU | 2074300 | 9/2000 |
| AU | 2004260464 | 2/2005 |
| BR | 9807467 | 5/2000 |
| CA | 2285645 | 7/1998 |
| CA | 2299773 | 9/2000 |
| CA | 2532738 | 2/2005 |
| CA | 2753085 | 9/2010 |
| CN | 1860496 | 11/2006 |
| CN | 102439620 | 5/2012 |
| DE | 69837194 | 10/2007 |
| EP | 0965192 | 12/1999 |
| EP | 1045547 | 10/2000 |
| EP | 1326185 | 7/2003 |
| EP | 1652045 | 5/2006 |
| EP | 1744276 | 1/2007 |
| EP | 1964597 | 9/2008 |
| EP | 2118757 | 11/2009 |
| EP | 2118840 | 11/2009 |
| EP | 2126708 | 12/2009 |
| EP | 2131933 | 12/2009 |
| EP | 2131934 | 12/2009 |
| EP | 2131935 | 12/2009 |
| EP | 2132650 | 12/2009 |
| EP | 2404268 | 1/2012 |
| GB | 2447020 | 9/2008 |
| GB | 2447094 | 9/2008 |
| GB | 2447095 | 9/2008 |
| GB | 2447096 | 9/2008 |
| GB | 2447100 | 9/2008 |
| GB | 2461175 | 12/2009 |
| IL | 130735 | 5/2004 |
| JP | 11008585 | 1/1999 |
| JP | 2000307530 | 11/2000 |
| JP | 2001508259 | 6/2001 |
| JP | 2001306936 | 11/2001 |
| JP | 2003122982 | 4/2003 |
| JP | 2003263529 | 9/2003 |
| JP | 2005038323 | 2/2005 |
| JP | 2005086308 | 3/2005 |
| JP | 3845119 | 11/2006 |
| JP | 2006304286 | 11/2006 |
| JP | 2006528388 | 12/2006 |
| JP | 3895759 | 3/2007 |
| JP | 2008059444 | 3/2008 |
| JP | 2009544081 | 12/2009 |
| JP | 2010519976 | 6/2010 |
| JP | 2010520537 | 6/2010 |
| JP | 2010520538 | 6/2010 |
| JP | 2010520539 | 6/2010 |
| JP | 2010522909 | 7/2010 |
| JP | 2012519904 | 8/2012 |
| KR | 20030004155 | 1/2003 |
| KR | 1020030004155 | 1/2003 |
| KR | 20060052853 | 5/2006 |
| WO | 9831114 | 7/1998 |
| WO | 0079709 | 12/2000 |
| WO | 03091990 | 11/2003 |
| WO | 2005010702 | 2/2005 |
| WO | 2006026736 | 3/2006 |
| WO | 2007111470 | 10/2007 |
| WO | 2008003089 | 1/2008 |
| WO | 2008008899 | 1/2008 |
| WO | 2008008911 | 1/2008 |
| WO | 2008060032 | 5/2008 |
| WO | 2008104782 | 9/2008 |
| WO | 2008104783 | 9/2008 |
| WO | 2008104784 | 9/2008 |
| WO | 2008104785 | 9/2008 |
| WO | 2008104786 | 9/2008 |
| WO | 2008104795 | 9/2008 |
| WO | 2008106196 | 9/2008 |
| WO | 2008106197 | 9/2008 |
| WO | 2008108965 | 9/2008 |
| WO | 2008109299 | 9/2008 |
| WO | 2010101674 | 9/2010 |

OTHER PUBLICATIONS

"Nielsen to Test Electronic Ratings Service for Outdoor Advertising," VNU Media Measurement & Information, Oct. 8, 2002, [online] [Retrieved on May 16, 2006] Retrieved from the Internet <URL:http://www.nielsenmedia.com/newsreleases/2002/Nielsen_Outdoor.htm>.

IP Australia, "Examiner's first report on application No. 2010221698" dated Feb. 20, 2012 (2 pages).

IP Australia, "Patent Examination Report No. 2" dated Nov. 20, 2013 in connection with application No. 2010221698 (4 pages).

European Patent Office, "Supplementary European Search Report," issued in connection with application No. EP 10749075.7, dated Dec. 18, 2012 (5 pages).

Japan Patent Office, "Notice of Reasons for Rejection," issued in connection with application No. JP P2011-552954 dated Oct. 28, 2013 (7 pages).

Patent Cooperation Treaty, "International Search Report," issued by the International Searching Authority in connection with PCT application No. PCT/US2010/021649, dated Aug. 18, 2010 (4 pages).

Patent Cooperation Treaty, "Written Opinion of the International Searching Authority," issued by the International Searching Authority in connection with PCT application No. PCT/US2010/021649, dated Aug. 18, 2010 (6 pages).

European Patent Office, "Notice from the European Patent Office dated Oct. 1, 2007 concerning business methods" issued in the Official Journal EPO dated Nov. 1, 2007 (pp. 592-593).

European Patent Office, "Extended European Search Report," in European Application No. 07799199.0, dated Aug. 20, 2012, 6 pages.

The State Intellectual Property Office of the People's Republic of China, "Notice of the Second Office Action," dated Feb. 14, 2012, in Chinese application No. 200780021656.X, 8 pages (translated).

State Intellectual Property Office of China, "Decision of Rejection," in Chinese Application No. 200780021656.X, dated Jul. 23, 2012, 9 pages (translated).

"First Office Action," The State Intellectual Property Office of China, issued in Chinese application No. 200780021656.X dated Jan. 19, 2011 (3 pages).

(56) References Cited

OTHER PUBLICATIONS

"International Preliminary Report on Patentability," Patent Cooperation Treaty, issued in PCT application No. PCT/US2007/072544 dated Jan. 6, 2009 (5 pages).
Patent Cooperation Treaty, "International Search Report," issued by the International Searching Authority in connection with counterpart PCT application No. PCT/US2007/072544, dated Aug. 22, 2008 (2 pages).
Patent Cooperation Treaty, "Written Opinion of the International Searching Authority," issued by the International Searching Authority in connection with counterpart PCT application No. PCT/US2007/072544, dated Aug. 22, 2008 (3 pages).
Yeung et al., "A Comparative Study on Location Tracking Strategies in Cellular Mobile Radio Systems," published on Nov. 14, 1995, pp. 22, 24, 26, 28.
Handy et al., "Lessons Learned from Developing a Bluetooth Multiplayer-Game," Institute of Applied Microelectronics and Computer Science, University of Rostock, 2nd International Conference on Pervasive Computing, Workshop on Gaming Applications in Ubiquitous Computing Environments, Wien, Österreich, Apr. 18-23, 2004 (7 pages).
Battiti et al., "Location-Aware Computing: A Neural Network Model for Determining Location in Wireless Lans," Department of Information and Communication Technology, University of Trento, Feb. 2002 (17 pages).
Azondekon et al., "Service Selection in Networks Based on Proximity Confirmation Using Infrared," International Conference on Telecommunications (ICT), Beijing, 2002, pp. 1-5.
Bahl et al., "A Software System for Locating Mobile Users: Design, Evaluation, and Lessons," Technical Report MSR-TR-2000-12, Microsoft Research, Feb. 2000, pp. 1-13.
European Search Report, issued in EP Application No. 09 002 372.2-1238, completed May 25, 2009, 3 pages.
Written Opinion of the European Search Report, issued in EP Application No. 09 002 372.2-1238, completed May 25, 2009, 3 pages.
European Patent Office, "Communication pursuant to Article 94(3) EPC," issued in connection with application No. EP 09002372.2, dated Jun. 7, 2013, 9 pages.
Mexican Institute of Industrial Property, "The Result of Substantive Examination 1," issued in connection with application No. MX/a/2011/009300 on May 2, 2013 (4 pages).
Mexican Institute of Industrial Property, "The Result of Substantive Examination 2," issued in connection with application No. MX/a/2011/009300 on Aug. 16, 2013 (4 pages).

\* cited by examiner

DETERMINING RELATIVE EFFECTIVENESS OF MEDIA CONTENT ITEMS

CROSS-REFERENCE TO RELATED APPLICATIONS

The present application claims priority from U.S. Provisional Patent Application No. 61/157,843, filed on Mar. 5, 2009 and entitled "Measuring Internet Consumption Using Local Network Device Sampling, Filtering, and Recording," the disclosure of which is incorporated herein by reference.

The present application further claims priority as a continuation-in-part of U.S. Utility patent application Ser. No. 12/105,440, filed on Apr. 18, 2008 and entitled "Personalized Media Delivery Based on Detected Media Exposure," which claims priority from U.S. Provisional Patent Application No. 60/913,479, filed on Apr. 23, 2007 and entitled "Personalized Media Delivery Driven by Personal and Cohort Media Exposure". The disclosures of U.S. Utility patent application Ser. No. 12/105,440 and U.S. Provisional Patent Application No. 60/913,479 are incorporated herein by reference.

The invention described herein is related to U.S. patent application Ser. No. 11/216,543, filed Aug. 30, 2005, for "Detecting and Measuring Exposure to Media Content Items", the disclosure of which is incorporated herein by reference.

The invention described herein is related to U.S. patent application Ser. No. 12/478,502, filed Apr. 18, 2008, for "Measuring Exposure to Media Across Multiple Media Delivery Mechanisms", the disclosure of which is incorporated herein by reference.

BACKGROUND OF THE INVENTION

Field of the Invention

The invention generally relates to delivery of content such as advertisements, and more particularly to techniques for determining relative effectiveness of media content items by observing and correlating behavior with media content items to which panelists have been exposed.

Description of Background Art

In recent years, mechanisms by which media content is delivered (television programming, other video, audio, web pages, messages, and the like) have moved from a broadcast model in which the same media content is delivered to many or all consumers at the same time to an addressable model wherein the media content delivered to one consumer can be different than that delivered to another. Addressable set-top boxes facilitate on-demand presentation of specific content items, including pause, rewind, and fast-forward capability. Media content delivered via the Internet or via mobile phone can be personalized, for example by selection and presentation of advertisements targeted to a demographic and/or geographic region associated with the consumer.

For example, an automobile manufacturer may advertise differently depending on the average income associated with the ZIP code of the viewing consumer. An advertisement for an entry-level car model can run in a lower-income ZIP code, while an advertisement for a luxury-level car model can run in a higher-income zip code. Both advertisements play simultaneously in the two different geographic regions.

In some cases, the determination as to which advertisement to present to each consumer is a relatively simple matter; for example, a selection between an entry-level car model advertisement and a luxury-level car model advertisement may simply be based on easily-ascertainable demographic data for a region or community.

However, more sophisticated advertisement selection is much more difficult. Variants of advertisements may be more effective for various populations based on subtle and non-obvious preferences among consumers. For some consumers, a movie trailer emphasizing romantic scenes may be more effective than another trailer for the same movie emphasizing action scenes. Even more subtly, an advertisement employing a male voiceover may be more or less effective, for some audiences, than a similar advertisement employing a female voiceover. Age, gender, income level, and cultural factors may interact in various ways as predictors of the relative effectiveness of the advertisement variants.

Effectiveness of advertisements can be measured by determining how many people buy a product or take some other action after having been exposed to the advertisement. An increase in the number of visits to a company's website can be measured, particularly if a specific page is mentioned in the advertisement. For advertisements delivered via a website, a "click-through" rate can be ascertained, measuring the percentage of consumers that click on the advertisement to see more information about the advertised product or service. However, the relative effectiveness of specific advertisements (or variants) played simultaneously within or among multiple groups often cannot easily be ascertained simply by measuring aggregate website visits.

Media companies and advertisers often engage in expensive and time-consuming market research to ascertain the relative effectiveness of various advertisements for various populations. Often, such market entails the use of focus groups, professional marketing specialists, statistical analyses, and the like.

Because of the expense and complexity of such research, it is often difficult or impossible for advertisers (or other content providers) to make real-time determinations or adjustments in content selection. When an increase or decrease in effectiveness of an advertisement with respect to a group of consumers is detected, research may be performed to identify ways to improve the selection and targeting of advertisements based on the new data. However, such research takes time and cannot generally be implemented in real-time. Accordingly, existing techniques for selecting and presenting advertisements are unable to quickly adapt to changes in measured effectiveness of such advertisements.

What is needed, therefore, is a system and method for real-time analysis to determine effectiveness of media content items such as advertisements. What is further needed is a system and method for selecting advertisements and advertisement variants based on measured effectiveness of advertisements with respect to particular consumers or groups of consumers. What is needed is a system and method that obtains a measure of effectiveness for an advertisement or other content item, and applies such data in selecting and/or tailoring content to be presented to a group of consumers.

SUMMARY OF THE INVENTION

In various embodiments, the present invention is a system and method for measuring the effectiveness of advertisements with respect to a group of panelists. Based on such measurements, particular advertisements and/or variants thereof can be selected for presentation to consumers. The group of panelists can be defined based on any characteristic or combination of characteristics, including for example demographic, psychographic, and/or geographic characteristics, as well as patterns of purchasing history and the like. Effectiveness of advertisements is measured, in one embodiment, by detecting exposure to advertisements, and then monitoring panelist behavior following exposure to an advertisement. In one embodiment, the group of panelists is a representative sample of a larger population, so that observations of panelist behavior can be used as a basis for making decisions regarding presentation of advertisements to a larger audience having characteristics similar to those of the panelists.

For example, in one embodiment, the system of the present invention determines how many panelists visit a website after being presented an advertisement mentioning the website. In another embodiment, the system of the present invention determines how many panelists purchase a product or service after being presented an advertisement for the product or service.

In one embodiment, the techniques of the present invention are applied to variants of advertisements. Several variants of an advertisement can be developed, having different features or characteristics such as voiceovers, scenes, type of products mentioned, and the like. Based on observed panelist behavior after exposure to the various advertisement variants, conclusions can be drawn as to the relative effectiveness of the variants for various audiences. The various audiences can be grouped by common characteristics, such as demographics, age, gender, geography, and the like.

Once the relative effectiveness for various audiences has been determined, output can be generated indicating the determined effectiveness. In addition, in one embodiment, the determined relative effectiveness is used in the selection of advertisements for presentation to individual consumers or to groups of consumers, so as to maximize effectiveness. In one embodiment, such analysis and selection is performed substantially in real-time, so as to provide highly adaptive and responsive advertisement selection to improve overall effectiveness of the advertising campaign.

One skilled in the art will recognize that the particular layouts and arrangements shown in the Figures are merely exemplary, and that the invention can be implemented in many other ways without departing from the essential characteristics as set forth in the claims.

DETAILED DESCRIPTION OF THE EMBODIMENTS

For purposes of the following description, the term "consumer" refers to any user, individual, viewer, visitor, or other individual or entity to whom content can be presented. The specific use of the term "consumer" is not intended to be limiting in any way. The term "panelist" refers to any user, individual, viewer, visitor, or other individual or entity whose exposure to content is being monitored. As discussed in more detail below, the system of the present invention can detect events associated with panelists, including for example actions performed by panelists, so as to determine the effectiveness of content presented to those panelists. As discussed below, in various embodiments, panelists can be selected to be representative of a larger population of individuals. Various mechanisms exist for selecting panelists, including random selection, self-selection, or the like.

For illustrative purposes, the invention is described in the context of analyzing effectiveness of advertisements presented to panelist, and selecting and/or tailoring advertisements for presentation to consumers. However, one skilled in the art will recognize that the techniques of the present invention can be used for analyzing, selecting and/or tailoring any type of content, and is not limited to advertisements. Accordingly, the particular description set forth herein is intended to be illustrative and not limiting.

System Architecture

Figure 1:
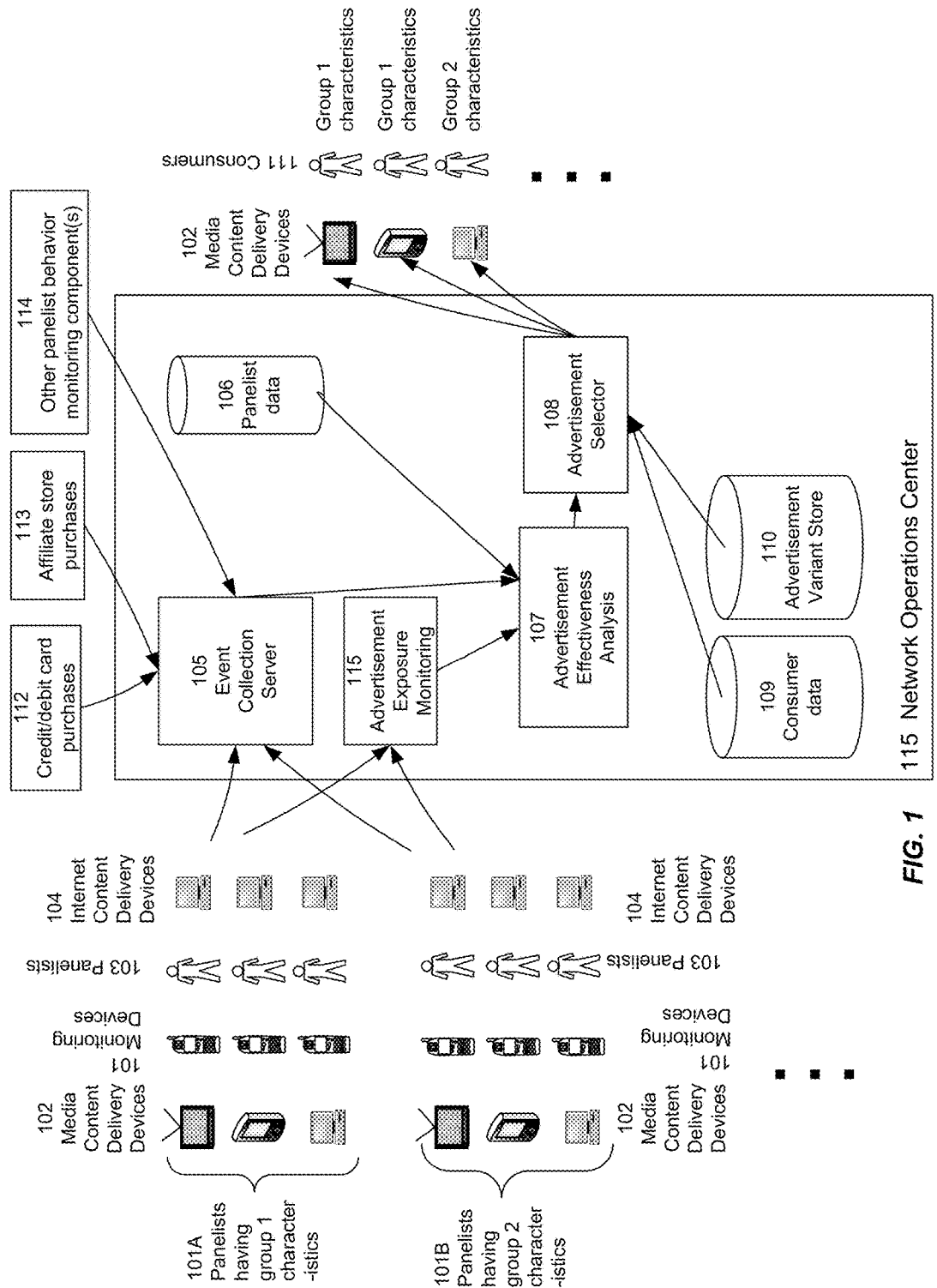
FIG. 1 is a block diagram depicting an architecture for practicing the present invention, according to one embodiment.

Referring now to FIG. 1, there is shown a block diagram depicting an architecture for practicing the present invention, according to one embodiment. Several components of the system are depicted as being part of network operations center (NOC) 115; however, one skilled in the art will recognize that such components can be implemented at other locations, and may be local or remote with respect to one another.

In one embodiment, NOC 115 contains components for storing, interpreting, and analyzing intercepted signatures, for monitoring exposure to advertisements, for detecting relevant events, for analyzing effectiveness of advertisements, and for selecting advertisements for presentation, as described in more detail below. In one embodiment, NOC 115 is implemented at some central location, communicatively coupled with monitoring software installed on Internet content delivery devices 104 such as client computing devices.

Internet content delivery devices 104 may be personal computers, handheld computers, personal digital assistants, smartphones, cell phones, kiosks, or any other device capable of delivering and presenting Internet content. In one embodiment, NOC 115 receives data from Internet content delivery devices 104 and/or monitoring devices 101, as well as from panelist behavior monitoring components 112, 113, and 114, either directly or via intermediate data collectors, routers, and/or other components.

Communication among the components shown in FIG. 1 can take place via a computing network, or by any known techniques of electronic communication, whether wired or wireless or some combination thereof. In one embodiment, communication between NOC 115 and other components takes place over the Internet, using well-known communication protocols such as Hypertext Transfer Protocol (HTTP) and Transmission Control Protocol/Internet Protocol (TCP/IP).

In one embodiment, any number of groups 101 of panelists 103 are defined. Groups 101 are defined according to one or more characteristics, such as demographics, geographical area, purchase history, and the like. Thus, panelists 103 are identified as being part of a group 101 based on known characteristics of the panelists 103, and such characteristics are shared among all members of a particular group 101. In one embodiment, panelists 103 can be any users, consumers, website visitors, or other individuals whose exposure to media is being tracked. Particular individuals can be selected to be panelists 103, either by random selection, volunteering, paid participation, or the like.

It is preferable, though not required, that panelists 103 be representative of a larger population of individuals having the defined characteristics, so that meaningful predictions, assessments, and extrapolations can be made as to the effectiveness of various advertisements based on the observed behavior of panelists 103 after being exposed to advertisements. Various mechanisms can be employed for incentivizing individuals to agree to be designated as panelists 103, including monetary incentives and the like. Alternatively, in some embodiments, individuals can be designated as panelists 103 without their consent, and even without their knowledge.

Media content items can be delivered to panelists 103 via any delivery device(s) 102, including for example television, radio, cell phone, computer, and the like. In one embodiment, panelist 103 exposure to media content, such as advertisements, is monitored according to any of a number of techniques, including for example: audio signature matching performed by software running on a monitoring device 101 (such as a cell phone or other mobile client device) carried by or otherwise associated with panelist 103; reading of watermarks embedded in media content by a standalone client, mobile phone software, or computer client software; viewership tracking performed at a set-top box; and/or by interception and identification of media content played on a computer.

As described in U.S. patent application Ser. No. 11/216,543, filed Aug. 30, 2005, for "Detecting and Measuring Exposure to Media Content Items" and/or U.S. patent application Ser. No. 12/478,502, filed Apr. 18, 2008, for "Measuring Exposure to Media Across Multiple Media Delivery Mechanisms", the disclosures of which are incorporated herein by reference, monitoring can be implemented by the use of monitoring devices 101 carried by or otherwise associated with panelists 103. For example, panelists 103 can carry mobile client devices, such as cellular telephones, that periodically sample ambient audio in order to detect exposure to media content items. Signatures derived from sampled audio can be compared with signatures associated with reference audio, according to techniques described in related U.S. Patent Applications referenced above, in order to identify the content items to which panelist 103 has been exposed. Such monitoring can detect and identify media content items regardless of the type of delivery device 102 used to deliver and receive the content. In one embodiment, signature matching and other techniques for monitoring exposure to content are performed, as described in the above-referenced related U.S. Patent Applications.

In one embodiment, panelists 103 may be exposed to content delivered via the Internet; for example, panelists 103 may use a computing device or other Internet content delivery device 104 to view websites or to obtain other Internet-based content. Internet content delivery device 104 may include a processor, input and output devices, memory, and a network connection interface, according to an architecture that is well known for computing devices and other devices for viewing Internet content. Software such as a browser may run on device 104, to enable viewing of and interaction with Internet content. Monitoring of exposure to such content can be performed by tracking software installed at Internet content delivery device 104, or by other means. Such tracking techniques are described in related U.S. Patent Applications referenced above.

In one embodiment, exposure to media across multiple delivery mechanisms can also be performed, so as to combine media exposure detection using software with media exposure detection using ambient audio. In this manner a more complete picture of the overall media exposure experienced by panelist 103 can be obtained. For example, as described in U.S. patent application Ser. No. 12/478,502, an audio intercept device carried by a panelist can monitor ambient audio and thereby detect audio content items to which the panelist is exposed, and an Internet content monitoring device can be implemented as software installed on an electronic device capable of receiving and presenting Internet content (such as a computer, mobile device, smartphone, or the like). In other embodiments, other mechanisms for detecting media exposure can be performed; the particular detection techniques described herein are merely exemplary and are not essential to the claimed invention.

In one embodiment, advertisement exposure monitoring module 115 collects information from one or more of the various exposure detection mechanisms described above, so as to determine which media content items each panelist 103 has been exposed to. In one embodiment, advertisement exposure monitoring module 115 tracks multiple exposures to the same or similar media content items, and tracks account additional factors, such as the time of day of each exposure, context of each exposure, and the like.

In one embodiment, collection of information by advertisement exposure monitoring module 115 is performed in real-time, so as to facilitate up-to-date analysis of advertisement effectiveness, and so as to facilitate dynamic adjustments to selection parameters and thereby maximize the effectiveness of presented advertisements.

Event collection server 105 collects information describing various events that may be relevant in determining effectiveness of advertisements. In various embodiments, event collection server 105 can collect such information from any available source or combination of sources. In one embodiment, client software installed at Internet content delivery devices 104 monitors panelists' 103 Internet browsing events relevant to advertisement effectiveness, such as visitation to websites associated with advertised products and/or services.

Other examples of sources of event information exist. For example, event collection server 105 can interface with sources 112 of information describing credit/debit card purchases, such as financial institutions, credit card companies, or the like. Purchase information can also be collected from affiliate stores 113, for example by interfacing with point-of-sale systems and/or customer loyalty card databases. Such information can be used to identify purchases of particular products by panelists 103, so as to facilitate an analysis of the effect of advertisements on purchasing behavior.

In other embodiments, other behavior monitoring component(s) 114 can be used, for example to detect different types of panelist 103 behavior or actions. Any detectable action or behavior by panelist 103 can potentially be collected by event collection server 105. Behavior detected by the system of the present invention can include any action(s) performed by a panelist 103 that may be relevant in determining the effectiveness of an advertisement, including for example purchases, subscriptions, enrollments, inquiries, telephone calls, visits to websites, watching certain television programs, text messages, email messages, other types of communication, and the like. For illustrative purposes, the following is a list of additional examples of panelist 103 actions that can be monitored:

Lowering a home thermostat (to assess the effectiveness of a public service announcement extolling the virtues of energy conservation);

Looking up movie times on the Internet (to assess the effectiveness of a movie trailer to which panelist 103 has been exposed); and Installing virus protection software on a computer (to assess the effectiveness of a virus alert).

Such information can be used to identify particular actions performed by panelists 103, so as to facilitate an analysis of the effect of advertisements on behavior. Thus, the techniques of the present invention are not necessarily limited to analysis of purchasing behavior. Rather, any type of panelist 103 actions can be monitored so as to gauge the effectiveness of advertisements or other content. In one embodiment, several variants of advertisements can be presented to different panelists 103 within a group. For example, multiple variants can be created with slightly different voice-overs, advertised price-points, or other variations. By presenting different variants to different panelists 103 within a group, the most effective variant for consumers having characteristics corresponding to that group can be identified. Specifically, the system of the present invention can monitor behavior of panelists 103 after exposure to these variants, and can thereby analyze of the relative effectiveness of the variants with respect to panelists 103 having certain characteristics or belonging to a particular group. Then, advertisement effectiveness analysis module 107 determines the most effective variant for presentation to consumers having characteristics that associate them with the particular group.

Advertisement effectiveness analysis module 107 analyzes events from event collection server 105 and advertisement exposure data from advertisement exposure monitoring module 115 in order to gauge the effectiveness of various advertisements in influencing panelist 103 behavior. In one embodiment, module 107 uses panelist data 106, which describes various characteristics of panelists 103, so as to make inferences as to the effectiveness of various advertisements with respect to groups having common characteristics. For example, group 101A may include panelists 103 having certain characteristics (e.g., older females), while group 101B may include panelists 103 having different characteristics (e.g. younger males). By noting the behavior of group 101A panelists 103 and group 101E panelists 103 with respect to an advertisement variant, module 107 determines the relative effectiveness of the variant with respect to consumers having the characteristics of the respective groups 101A, 101B. In addition, module 107 can determine the relative effectiveness of two or more variants with respect to consumers having the characteristics of a particular group 101. In one embodiment, module 107 stores the results of its analysis in a storage device (not shown) for use by advertisement selector 108.

Based on the analysis performed by module 107, advertisement selector 108 selects an advertisement (or variant) from advertisement variant store 110 to be presented to a particular consumer 111. Advertisement variant store 110 is a data storage component for storing advertisements, variants, and/or other content items that may be selected for presentation to consumers 111. In one embodiment, advertisement selector 108 retrieves relevant results from the analysis previously performed by module 107, and uses the retrieved results in selecting the advertisement to be presented to consumer 111. In one embodiment, advertisement selector 108 generates a personalized advertisement by obtaining standard content from a data store (not shown), and modifying the standard content according to the analysis previously performed by module 107, so as to maximize effectiveness of the advertisement.

In one embodiment, selector 108 selects (and/or personalizes) an advertisement in response to a specific request for an advertisement, for example if a commercial break is commencing or approaching and a consumer 111 is to be presented an advertisement during the break. Characteristics of consumer 111 are obtained from data store 109 containing consumer data, so that selector 108 can identify a group with which consumer 111 can be affiliated, and thereby select an advertisement based on module's 107 determination of relative advertisement effectiveness for panelists 103 having characteristics that resemble those of consumer 111. In the example of FIG. 1, the first two consumers 111 have characteristics indicating membership in group 1, while the third consumer 111 has characteristics indicating membership in group 2. Accordingly, advertisement selector 108 determines an advertisement for the first two consumers 111 based on the determined advertisement effectiveness with respect to panelists 103 from the group 101A having group 1 characteristics, while advertisement selector 108 determines an advertisement for the third consumer 111 based on the determined advertisement effectiveness with respect to panelists 103 from the group 101B having group 2 characteristics.

The selected advertisement is presented to consumer 111, for example by transmitting the advertisement to directly addressable media content delivery device 102 associated with consumer 111. In some embodiments, some or all media content delivery devices 102 may be individually addressable, allowing any number of variants to be specifically selected and presented to individual panelists 103.

One skilled in the art will recognize that any technique for transmitting, displaying, or otherwise presenting an advertisement to consumer 111 can be used, including, for example, television, radio, Internet streaming media, and/or other media transmission/presentation mechanism. The advertisement (or other content) is delivered, for example, by individually addressing a delivery device for consumer 111 and/or by addressing delivery devices for a group of cohorts of consumer 111 simultaneously. Examples of individually addressable devices include digital video recorders (DVRs), Internet streaming media feeds, mobile phone, and the like.

In one embodiment, the monitoring of advertisement exposure and events, as well as the analysis of advertisement effectiveness and selection of advertisements for presentation to consumers 111, are performed substantially in real-time, so as to minimize the delay in implementing recommendations based on observed behavior. Such real-time analysis and selection provides particular advantages in dynamic environments wherein advertisements may change frequently, or may become obsolete quickly. The techniques of the present invention ensure that advertisement selection takes place based on timely, up-to-date information.

Method

Figure 2:
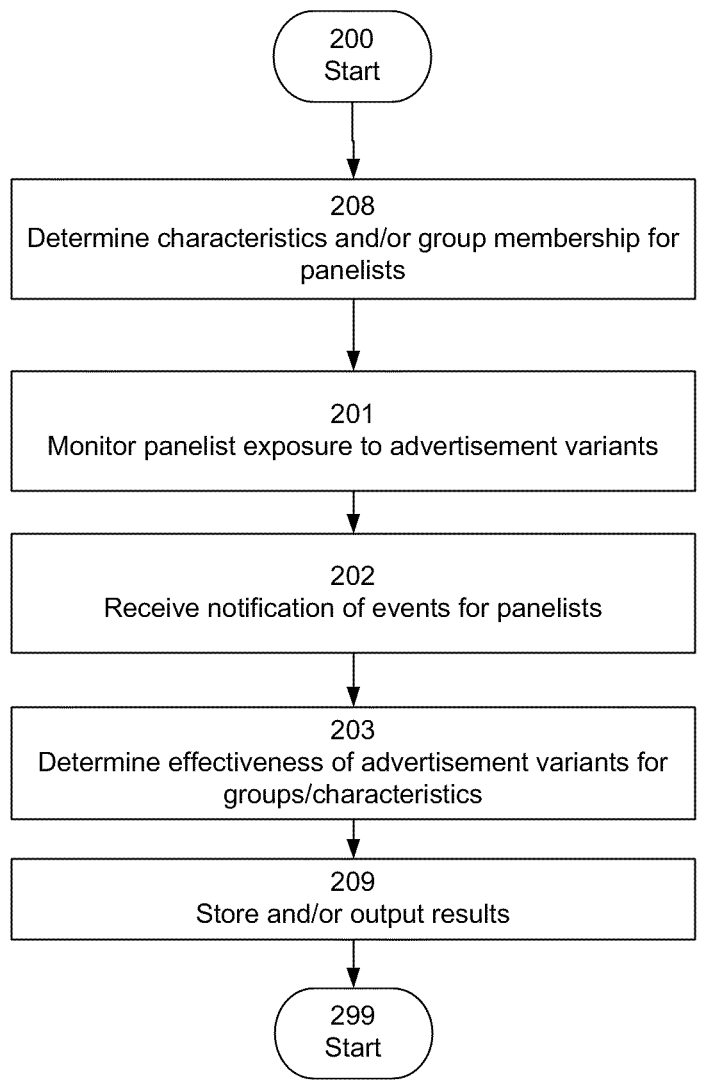
FIG. 2 is a flow diagram depicting a method for determining effectiveness of advertisement variants according to one embodiment.

Referring now to FIG. 2, there is shown a method for determining effectiveness of advertisement variants according to one embodiment. Characteristics and/or group membership for panelists 103 are determined 208. Such characteristics may include demographics, income levels, geographic location, interest in particular topics, and/or the like. Any such characteristics can be used to identify panelists 103 as belonging to any definable group, such as for example, older females, younger males, homeowners, students, people living in rural areas, or the like.

Panelist 103 exposure to advertisement variants (and/or other content items) is monitored 201. In some embodiments, the system of the present invention specifically selects different variants to be presented to different panelists 103 belonging to a particular group, so as to enable comparison of the effectiveness of the variants with respect to individuals have some characteristic(s) in common with one another.

The system of the present invention receives 202 notification of events associated with panelists 103. As described above, such events may include actions performed by panelists 103, such as purchase events collected from credit card companies, retailers, or the like, as well as non-purchase-related events. Based on the monitored exposure to advertisement variants and on the detected events, the system of the present invention determines 203 the effectiveness of advertisement variants with respect to panelists 103 belonging to certain groups and/or having certain characteristics. In one embodiment, effectiveness is assessed by comparing the relative occurrence of desirable events among panelists 103 having various characteristics, and/or by noting any variation in relative occurrence of desirable events resulting from presentation of different advertisement variants.

In one embodiment, steps 201, 202, and 203 are performed substantially in real-time, with continual updates to the analysis of step 203 being performed as new data is collected.

In one embodiment, the results of step 203 are stored 209 for use in selecting an advertisement and/or output as part of a report. For example, representations of correlations between desirable events and various advertisement variants for different groups and/or characteristics of panelists can be stored in a storage device and/or included in a report. In other embodiments, these representations are not stored, but are generated substantially in real-time, for example in response to a request for an advertisement.

Figure 3:
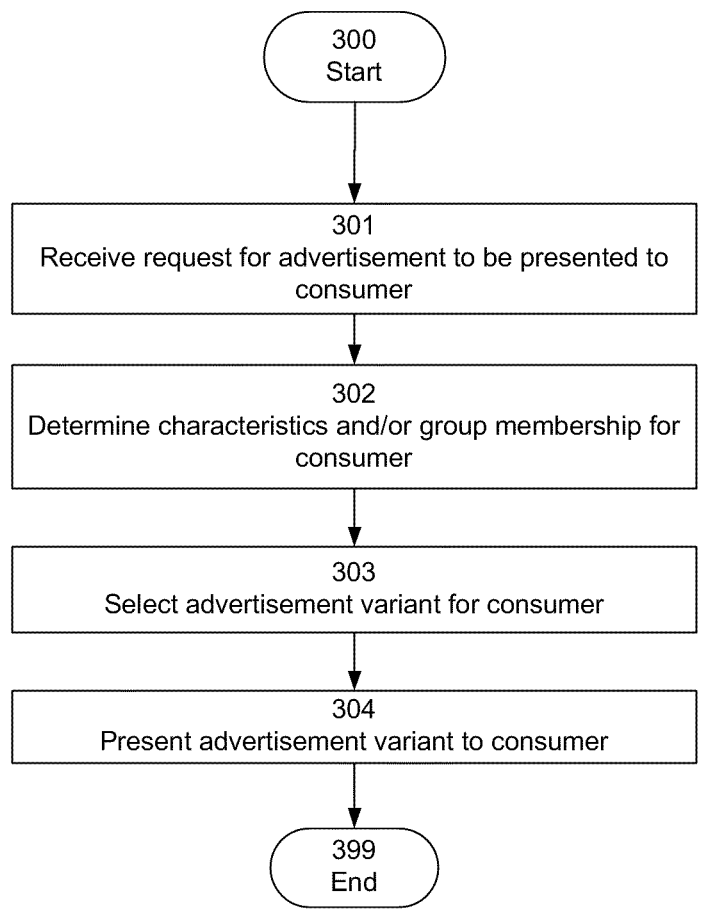
FIG. 3 is a flow diagram depicting a method for selecting an advertisement variant for a consumer according to one embodiment.

Referring now to FIG. 3, there is shown a flow diagram depicting a method for selecting an advertisement variant for a consumer according to one embodiment. When a request for an advertisement to be presented to a consumer 111 is received 301, the system of the present invention determines 302 characteristics of the consumer 111 relevant to selection of an advertisement. These characteristics may, for example, indicate that consumer 111 should be treated as belonging to an identified group corresponding to one of the groups 101 of panelists 103. In this manner, advertisement effectiveness that was determined with respect to the relevant group 101 can be applied in selecting 303 an advertisement (and/or advertisement variant) for consumer 111. The selected advertisement (and/or advertisement variant) is then presented 304 to consumer 111, for example by transmitting the advertisement to a directly addressable media content delivery device 102 associated with consumer 111, or by making the advertisement available to consumer 111 by some other means.

One skilled in the art will recognize that the techniques of the present invention can be used in connection with any type of content, and are not limited to advertisements. The system of the present invention can therefore present personalized content to consumer 111, including for example, video programming, text programming, audio programming, advertising messages, coupons, directions and/or a map to a store, other media messages, entire songs or video shows, or any combination thereof.

In one embodiment, advertisement selector 108 selects advertisements (or other content) based on known attributes of consumer 111, combined with the above-described techniques for analysis of advertisement effectiveness for groups 101 of panelists 103. Such attributes may include geographical location, purchase history, stated preferences, or the like.

In this manner, the system of the present invention can take into account additional factors in addition to the analysis of advertisement effectiveness. For example, consumer 111 may have explicitly stated a preference to receive advertisements on a particular subject, while also explicitly stating a preference to not receive advertisements on a second topic. Consumer 111 may also be known to be located in a particular geographic area. Advertisement selector 108 can take into account such stated preferences, and such geographic location, in addition to the above-described techniques for assessing advertisement effectiveness.

In one embodiment, the system of the present invention selects and inserts personalized content into advertisements or other standard content. The personalized content is selected according to techniques described above, wherein consumer's 111 particular characteristics and/or membership in a group are taken into account, so as to identify those personalized elements that are most likely to be effective based on previously detected behavior of panelists 103 in response to such personalized elements. Additional factors can also be taken into account, such as known preferences of consumer 111. Personalized content is then inserted in standard content, for example to incorporate a personalized advertisement in a television show obtained from a media source, as described in U.S. Utility patent application Ser. No. 12/105,440, filed on Apr. 18, 2008 and entitled "Personalized Media Delivery Based on Detected Media Exposure," the disclosure of which is incorporated herein by reference. The content is then presented to user according to techniques described above.

Data Signature Algorithm

In one embodiment, advertisement exposure monitoring module 115 of the present invention detects panelist 103 exposure to advertisements and other content based on data collected from monitoring devices 101. For example, panelists 103 can carry mobile client devices, such as cellular telephones, that periodically sample ambient audio in order to detect exposure to media content items. The sampled audio is transformed into signatures, which are then compared with signatures associated with reference audio, according to techniques described in related U.S. Patent Applications referenced above, in order to identify the content items to which panelist 103 has been exposed.

Audio data signature transformation can be performed according to any of a number of well-known algorithms. As described in related U.S. Patent Applications, the audio data signature transformation algorithm finds matching audio streams in broadcast audio signals, known to be transmitted at a certain time, and asynchronous audio signals such as music tracks and video game sound tracks.

In one embodiment, the audio data signature transformation algorithm correlates a data signature stream associated with a panelist 103 against a potentially large number of candidate data signature streams derived from reference media items.

In one embodiment, the system of the present invention uses a signature transformation algorithm such as Shazam, described in Wang et al. and available from Shazam Entertainment Ltd., of London, England. This algorithm is also described in Avery Li-chun Wang, "An Industrial-Strength Audio Search Algorithm," October 2003, and Avery Li-Chun Wang and Julius O. Smith, III, WIPO publication WO0211123A3, 7 Feb. 2002, "Method for Search in an Audio Database." The signature transformation algorithm generates a 4 k file that is spooled (temporarily stored) at device 101. In one embodiment, device 101 erases the raw audio file once the signature file has been created; in another embodiment, raw audio is saved for some period of time for testing purposes. Signature transformation can take place at device 101, or at some component of NOC 115, or at some other location.

In one embodiment, the parameters of the audio acquisition (sampling rate, sampling duty cycle, quiescent time between sampling periods, volume, filter parameters, and the like), and even the algorithm in use, can be adjusted dynamically by device 101 and/or by NOC 115. These adjustments may be a function of location information downloaded to device 101 from NOC 115 in advance or in near real-time based on current location. These adjustments are performed, for example, to increase matching accuracy, minimize data transmission, minimize device 101 battery drain, and for other system performance optimizations.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, transformed, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Accordingly, in various embodiments, the present invention can be implemented as software, hardware, or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, desktop computer, laptop computer, consumer electronic device, television, set-top box, or the like. An electronic device for implementing the present invention may use an operating system such as, for example, Microsoft Windows Vista available from Microsoft Corporation of Redmond, Wash., or any other operating system that is adapted for use on the device.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A method comprising:
   associating corresponding panelists of a plurality of panelists with corresponding groups based on one or more characteristics of the panelists;
   sampling ambient audio collected by a mobile computing device to generate sampled audio;
   generating first signatures or collecting first human-inaudible codes from the sampled audio to identify first media having audio included in the ambient audio and exposed to a first panelist of the plurality of panelists, the media identified by comparing the generated first signatures or collected first human-inaudible codes to reference signatures or reference human-inaudible codes associated with reference media;
   accessing, with a computing device, a notification of a first Internet action performed by the first panelist;
   correlating, with the computing device, the first Internet action with exposure to the first media identified based on the generated first signatures or collected first human-inaudible codes, the correlating of the first Internet action performed substantially instantaneously as the first Internet action occurs in response to the notification of the first Internet action;
   determining a first effectiveness score of the first media in affecting behavior of a first one of the groups of panelists based on the correlation of the first Internet action with the exposure to the first media;
   generating second signatures or collecting second human-inaudible codes to identify second media exposed to the first panelist or to a second panelist of the plurality of panelists by comparing the collected second signatures or the generated second human-inaudible codes to the reference signatures or the reference human-inaudible codes associated with the reference media, the second panelist and the first panelist belonging to a same one of the groups;
   accessing, with the computing device, a notification of a second Internet action performed by the first panelist or the second panelist;
   correlating, with the computing device, the second Internet action with exposure to the second media identified based on the second signatures or second human-inaudible codes, the correlating of the second Internet action performed substantially instantaneously as the second Internet action occurs in response to the notification of the second Internet action;
   determining a second effectiveness score of the second media in affecting behavior for the first group based on the correlation of the second Internet action with the exposure to the second media;
   performing a comparison of the first effectiveness score and the second effectiveness score to determine a higher effectiveness score for affecting the first group;
   accessing data indicative of a characteristic of a user who is not a panelist;
   associating the user with the first group based on the characteristic of the user;
   selecting, with the computing device, the first media or the second media for presentation to the user based on the higher effectiveness score and the first group with which the user is associated; and
   electronically transmitting the selected one of the first media or the second media from the computing device for presentation to the user.

2. The method of claim 1, wherein the selected one of the first media or the second media includes an advertisement.

3. The method of claim 1, wherein:
   the selected one of the first media or the second media is presented via a first communication mechanism; and
   at least one of the first Internet action or the second Internet action includes a communication transmitted via a second communication mechanism different from the first communication mechanism.

4. The method of claim 1, further including:
   monitoring, with the computing device, an additional exposure of the first panelist to the first media;
   receiving, with the computing device, an additional notification of an additional Internet action performed by the first panelist;
   correlating, with the computing device, the additional Internet action with the additional exposure to the first media to determine an updated effectiveness score of the first media in affecting behavior of panelists in the first group; and
   presenting the updated effectiveness score via an output device.

5. The method of claim 4, wherein correlating the additional Internet action with the additional exposure to the first media is performed by the computing device substantially instantaneously in response to the additional notification.

6. The method of claim 1, wherein accessing data indicative of the characteristic of the user, associating the user with the first group, selecting the first media or the second media for presentation to the user, and transmitting the selected one of the first media or the second media are performed by the computing device in response to receiving a request for media to be presented to the user.

7. The method of claim 6, wherein the request for media to be presented to the user includes at least one of:
   a request for a web page;
   a request for a resource associated with a web page;
   a request for a component associated with a web page;
   a request for an advertisement to be displayed in connection with a web page;
   a request for audiovisual content to be presented to the user; or
   a request for a television commercial to be presented to the user.

8. The method of claim 1, further including:
   storing a representation of the first effectiveness score and the second effectiveness score in a database;
   wherein selecting the first media or the second media for presentation to the user includes:
   retrieving a previously stored representation of the first effectiveness score of the first media and the second effectiveness score of the second media in affecting behavior of a first one of the groups having the determined characteristic of the user; and
   selecting the first media or the second media based on the previously stored representation of the first effectiveness score and the second effectiveness score.

9. The method of claim 6, wherein the selected media includes an advertisement.

10. The method of claim 1, wherein the selected media includes at least one of:
   a discount offer;
   an audiovisual program;
   a song;
   an audio program;
   a game;
   a survey;
   a representation of award points;
   a coupon; or
   an invitation.

11. The method of claim 1, wherein transmitting the selected one of the first media or the second media includes transmitting the selected one of the first media or the second media to an output device viewable by the user.

12. The method of claim 1, wherein transmitting the selected one of the first media or the second media includes transmitting the selected one of the first media or the second media to a directly addressable media delivery device associated with the user.

13. The method of claim 1, wherein transmitting the selected media includes:
   obtaining standard media from a media source;
   inserting the selected one of the first media or the second media in the obtained standard media; and
   transmitting the standard media, including the selected one of the first media or the second, for presentation to the user.

14. The method of claim 1, wherein selecting the first media or the second media for presentation to the user is further based on the characteristic of the user.

15. The method of claim 1, wherein selecting the first media or the second media for presentation to the user includes modifying existing media based on an effectiveness score of the existing media for one of the groups with which the user is associated, and transmitting the selected one of the first media or the second media includes transmitting the modified media for presentation to the user.

16. The method of claim 1, wherein the characteristic includes at least one of:
   a demographic characteristic;
   a geographic characteristic;
   a characteristic based on previous purchases;
   a characteristic based on previous actions; or
   a characteristic based on preferences.

17. The method of claim 1, wherein at least one of the first Internet action or the second Internet action performed by at least one of the first panelist or the second panelist includes a purchase of a product or a service associated with the first media or the second media to which the first or the second panelist has been exposed.

18. The method of claim 1, wherein at least one of the first Internet action or the second Internet action performed by at least one of the first panelist or the second panelist includes an action associated with the first media or the second media to which the first panelist or the second panelist has been exposed.

19. The method of claim 1, wherein at least one of the first media or the second media includes at least one of:
   an audiovisual program;
   a television program;
   a movie;
   a radio program;
   content presented via a music delivery device;
   content presented via an audio player;
   content presented via a compact disc;
   content presented via a DVD;
   content presented via a Blu-Ray disc;
   a video game;
   content presented at a website; or
   content presented via an Internet browser.

20. The method of claim 1, wherein at least a one of the first media or the second media is presented via a broadcast medium.

21. The method of claim 20, wherein a second one of the first media or the second media is presented via a non-broadcast medium.

22. The method of claim 1, further including:
   monitoring website visits for the first and second panelists; and
   identifying a web page visited by the first and second panelists.

23. A computer-readable storage medium comprising computer program code, encoded on the storage medium, which when executed causes a processor to at least:
   associate corresponding panelists of a plurality of panelists with corresponding groups based on one or more characteristics of the panelists;
   sample ambient audio collected by a mobile computing device to generate sampled audio;
   generate first signatures or collect first human-inaudible codes from the sampled audio to identify first media having audio included in the ambient audio and exposed to a first panelist of the plurality of panelists, the media identified by comparing the generated first signatures or collected first human-inaudible codes to reference signatures or reference human-inaudible codes associated with reference media;
   access a notification of a first Internet action performed by the first panelist;
   correlate, with a computing device, the first Internet action with exposure to the first media identified based on the generated first signatures or collected first human-inaudible codes, the correlating of the first Internet action performed substantially instantaneously as the first Internet action occurs in response to the notification of the first Internet action;
   determine a first effectiveness score of the first media in affecting behavior of a first one of the defined groups of panelists based on the correlation of the first Internet action with the exposures to first media;
   generate second signatures or collect second human-inaudible codes to identify second media exposed to the first panelist or to a second panelist of the plurality of panelists by comparing the generated second signatures or collected second human-inaudible codes to the reference signatures or the reference human-inaudible codes associated with reference media, the second panelist and the first panelist belonging to a same one of the groups;
   access, with the computing device, a notification of a second Internet action performed by the second panelist;
   correlate, with the computing device, the second Internet action with exposure to the second media identified based on the collected second signatures or generated second human-inaudible codes, the correlating of the second Internet action performed substantially instantaneously as the second Internet action occurs in response to the notification of the second Internet action;

determine a second effectiveness score of the second media in affecting behavior for the first group based on the correlation of the second Internet action with the exposure to second media;
perform a comparison of the first effectiveness score and the second effectiveness score to determine a higher effectiveness score for effecting the first group;
access data indicative of a characteristic of a user who is not a panelist;
associate the user with the first group based on the determined characteristic of the user;
select the first media or the second media for presentation to the user based on the higher effectiveness score and the first group with which the user is associated; and
transmit the selected one of the first media or the second media from the computing device for presentation to the user.

24. The computer-readable storage medium of claim 23, wherein the selected one of the first media or the second media includes an advertisement.

25. The computer-readable storage medium of claim 23, wherein:
the selected one of the first media or the second media is presented via a first communication mechanism; and
at least one of the first Internet action or the second Internet action includes a communication transmitted via a second communication mechanism different from the first communication mechanism.

26. A system comprising:
a plurality of panelist monitoring devices to:
sample ambient audio collected by a mobile computing device to generate sampled audio;
generate first signatures or collect first human-inaudible codes from the sampled audio to identify first media having audio included in the ambient audio and exposed to a first panelist of the plurality of panelists, the media identified by comparing the generated first signatures or collected first human-inaudible codes to reference signatures or reference human-inaudible codes associated with reference media;
monitor a first exposure to a first media by a first panelist of a plurality of panelists, the first media identified by comparing the generated first signatures or the collected first human-inaudible codes to reference signatures or reference human-inaudible codes associated with reference media;
access a notification of a first Internet action performed by the first panelist;
monitor a second exposure to a second media by at least one of the first panelist or a second panelist of the plurality of panelists, the second media identified by comparing generated second signatures or collected second human-inaudible codes to the reference signatures or the reference human-inaudible codes associated with reference media; and
access a notification of a second Internet action performed by the at least one of the first panelist or the second panelist; and a processor to:
associate corresponding panelists of a plurality of panelists with corresponding groups based on one or more characteristics of the panelists;
correlate the first Internet action with the first exposure to the first media identified based on the collected first signatures or generated first human-inaudible codes, the correlating of the first Internet action performed substantially instantaneously as the first Internet action occurs in response to the notification of the first Internet action;
correlate the second Internet action with the second exposure to the second media identified based on the collected second signatures or generated second human-inaudible codes, the correlating of the second Internet action performed substantially instantaneously as the second Internet action occurs in response to the notification of the second Internet action;
determine a first effectiveness score of the first media in affecting behavior of a first group of panelists based on the correlated first Internet action;
determine a second effectiveness score of the second media in affecting behavior for the first group of panelists based on the correlated second Internet action;
perform a comparison of the first effectiveness score and the second effectiveness score to determine a higher effectiveness score;
access data indicative of a characteristic of a user who is not a panelist;
associate the user with the first group based on the determined characteristic of the user; and
select the first media or the second media for presentation to the user based on the higher effectiveness score and the first group with which the user is associated.

27. The system of claim 26, wherein at least one of the first media or the second media includes an advertisement.

28. The system of claim 26, wherein:
at least one of the first media or the second media is presented via a first communication mechanism; and
at least one of the first or the second Internet action includes a communication transmitted via a second communication mechanism different from the first communication mechanism.

29. The method of claim 1, further including:
acquiring audio data from the first media;
detecting location information of the first panelist; and
dynamically adjusting a data acquisition rate of the audio data based on the location information, wherein the first signatures are generated or the first human-inaudible codes are collected based on the audio data.

30. The method of claim 1, wherein determining the first and second effectiveness scores and selecting the first media or the second media for presentation to the user are performed substantially instantaneously.

31. The computer-readable storage medium of claim 23, wherein the computer program code further causes the processor to determine the first and second effectiveness scores and select the first media or the second media for presentation to the user substantially instantaneously.

* * * * *